Jan. 4, 1938.    J. MULLER    2,104,493
DEVICE FOR EMPTYING TANKS
Filed Feb. 19, 1934
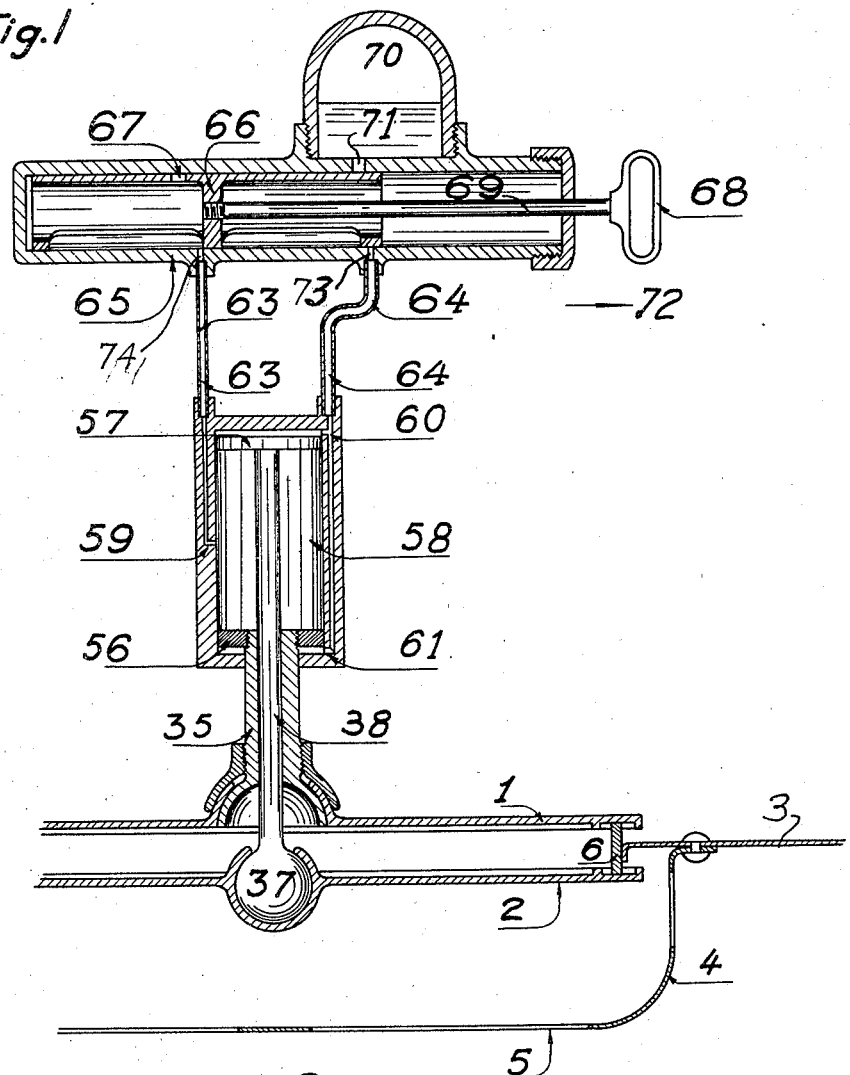
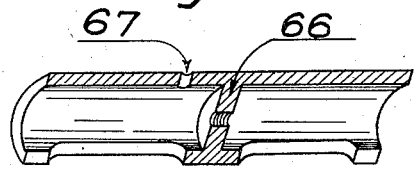
INVENTOR
JACQUES MULLER
By Bönnelycke, Young, Emery & Thompson
ATTORNEYS Patented Jan. 4, 1938

2,104,493

UNITED STATES PATENT OFFICE 2,104,493

DEVICE FOR EMPTYING TANKS

Jacques Muller, La Garenne-Colombes, France

Application February 19, 1934, Serial No. 712,071
In France March 9, 1933

6 Claims. (Cl. 137—21)

The present invention relates to apparatus for rapidly emptying tanks, and more particularly for unballasting aircraft, by positive opening and closing devices actuated from a distance.

It is well known that for various reasons it is desirable to empty tanks rapidly, partly or wholly, particularly the tanks of aircraft in flight or on the ground. On the other hand, it is necessary to have manipulating devices for the rapid emptying of tanks, which, when closed, will prevent leakage of liquid from the tanks.

The fuel tanks of aircraft are subjected, when landing, to forces which tend to effect leakage. For instance, when landing on the ground, the inertia of the fuel exerts an increased pressure on the interior of the tank and when landing upon water, the tanks are subjected to the pressure of the water on the exterior thereof.

It is therefore necessary to insure the impossibility of opening of the closing means in one direction or the other.

The apparatus forming the subject of the present invention comprises a double valve formed of two independent parts, each opening in the opposite direction to the other.

The apparatus also comprises actuating means, the actuations of which both for opening and closing are positive, insuring the sealing of the valves against the valve seats.

It will be understood that the devices for actuating the opening and closing valves may be of any suitable kind. In the accompanying drawing a number of examples have been given, but the scope of the invention is not to be limited to the said devices.

In the drawing:

Figure 1 is a vertical sectional fragmentary view of a double valve which is opened and closed by means of fluid pressure; and Fig. 2 is a sectional perspective view of a part of the valve actuating structure.

As shown in the drawing, the lower portion of tank 3 is provided with an opening surrounded by a flange 6, the upper and lower rims of which provide seats for the valves 1 and 2. Valve 1 is mounted by means of a ball joint on the lower end of a tubular member 35. Valve 2 is mounted by means of a ball joint on the lower end of rod 38 which slides through the tubular member 35. A piston 56 is affixed to the upper end of tubular member 35 and a piston 57 is affixed to the upper end of rod 38. Pistons 56 and 57 are displaceably mounted in a cylinder 58 provided with a center port 59 and end ports 60 and 61 which communicate with an actuating pump.

The ends ports are connected together and communicate through conduit 64 with port 73 of pump cylinder 65. A conduit 63 connects the center port 59 of cylinder 58 with port 74 of pump cylinder 65.

A tubular piston 66 is slidably mounted in cylinder 65 and is provided with a sleeve having a port 67.

This piston 66 is actuated by a handle 68 acting on a rod 69 which connects the handle to the piston. This pump is provided with a reservoir 70 containing a liquid constantly under pressure. This reservoir communicates with the cylinder 65 through the medium of a port 71.

In the position in Fig. 1 the liquid in the chamber 70 has transmitted its pressure to the right hand end of the pump cylinder and through the medium of the piston being moved to the left hand end enters the passage 63, port 59 and finally enters the cylinder 58 where it holds the valves on their seats.

If at this moment the handle 68 is pulled in the direction of the arrow 72, the port 71 is closed by the sleeve of the piston 66, the liquid at the right hand end of the pump passing through the passage 64 and the ports 60 and 61 so as to move the pistons 56 and 57 toward each other and through the medium of the rods 35 and 38 removes the valves 1 and 2 from their seats.

At the end of the stroke, the valves being open, the port 67 is opposite the port 71 and the passage 64 is exposed. The pressure existing in the chamber 70 is then transmitted by means of the ports 67 and 71 and the passage 64 to the pistons 56 and 57 which keep the valves 1 and 2 open without external intervention.

It will be understood that the device which has been described is not limiting, but is simply given by way of example, the invention comprising mainly the system of double valves opening in opposite directions and by the positive actuating means for opening and closing the valves.

Having now particularly described and ascertained the nature of my said invention and in what manner the same is to be performed, I declare that what I claim is:

1. A device for rapidly discharging the contents of a tank having a discharge opening, comprising a valve seat surrounding said opening on the interior of said tank, a similar valve seat on the exterior of said tank, a valve associated with each valve seat, and fluid-actuated means for effecting simultaneous opening and closing of both valves.

2. A device for rapidly discharging the contents of a tank having a discharge opening, comprising a valve seat surrounding said opening on the interior of said tank, a similar valve seat on the exterior of said tank, a valve associated with each valve seat, an actuating cylinder, a pair of pistons in said cylinder, means connecting one piston with one valve, means connecting the other piston with the other valve, a conduit for introducing a fluid into said cylinder intermediate the ends thereof and between said pair of pistons for shifting said pistons and the valves connected therewith to one position, a conduit for introducing a fluid into said cylinder at the ends thereof for forcing the pistons toward each other, and means for controlling the flow of fluid into said cylinder to adjust the position of said valves.

3. A device for rapidly discharging the contents of a tank having a discharge opening, comprising a valve seat surrounding said opening on the interior of said tank, a similar valve seat on the exterior of said tank, a valve associated with each valve seat, an actuating cylinder, a pair of pistons in said cylinder, means connecting one piston with one valve, means connecting the other piston with the other valve, a conduit for introducing a fluid into said cylinder intermediate the ends thereof and between said pair of pistons for shifting said pistons and the valves connected therewith to one position, a conduit for introducing a fluid into said cylinder at the ends thereof for forcing the pistons toward each other, a control cylinder, a semicylindrical tubular member slidably positioned in the control cylinder, a piston intermediate the ends of said tubular member, said conduits communicating with said control cylinder, and fluid pressure means for retaining said piston in either end of the control cylinder.

4. A device for rapidly discharging the contents of a tank having a discharge opening, comprising a valve seat surrounding said opening on the interior of said tank, a similar valve seat on the exterior of said tank, a valve associated with each valve seat, an actuating cylinder, a pair of pistons in said cylinder, means connecting one piston with one valve, means connecting the other piston with the other valve, a conduit for introducing a fluid into said cylinder intermediate the ends thereof and between said pair of pistons for shifting said pistons and the valves connected therewith to one position, a conduit for introducing a fluid into said cylinder at the ends thereof for forcing the pistons toward each other, a control cylinder provided with ports communicating with said conduits, a piston shiftable in said control cylinder for forcing a fluid from one end of the control cylinder into said actuating cylinder, a pressure chamber, means carried by the piston in the control cylinder for placing said control chamber in communication with said control cylinder to retain it in either end of its stroke, and means carried by said control piston for preventing communication between said pressure chamber and the actuating cylinder.

5. A device for rapidly discharging the contents of a tank having a discharge opening, comprising a valve seat surrounding said opening on the interior of said tank, a similar valve seat on the exterior of said tank, a valve associated with each valve seat, an actuating cylinder, a pair of pistons positioned therein, a hollow piston rod extending through one end of the cylinder and connecting one piston with one of said valves, a second piston rod extending concentrically through the hollow piston rod and connecting the other piston with the other valve, a conduit communicating with said cylinder intermediate its ends and between said pistons, a second conduit communicating with said cylinder at both ends, and means for forcing a fluid into either of said conduits to displace said pistons and control the position of said valves.

6. A device for rapidly discharging the contents of a tank having a discharge opening, comprising a valve seat surrounding said opening on the interior of said tank, a similar valve seat on the exterior of said tank, a valve associated with each valve seat, an actuating cylinder, a pair of pistons positioned therein, a hollow piston rod extending through one end of the cylinder and connecting one piston with one of said valves, a second piston rod extending concentrically through the hollow piston rod and connecting the other piston with the other valve, a conduit communicating with said cylinder intermediate its ends and between said pistons, a second conduit communicating with said cylinder at both ends, a control cylinder provided with ports communicating with said conduits, a piston shiftable in said control cylinder for forcing a fluid from one end of the control cylinder into said actuating cylinder, a pressure chamber, means carried by the piston in the control cylinder for placing said control chamber in communication with said control cylinder to retain it in either end of its stroke, and means carried by said control piston for preventing communication between said pressure chamber and the actuating cylinder.

JACQUES MULLER.